United States Patent [19]
Fields et al.

[11] 3,813,754

[45] June 4, 1974

[54] APPARATUS FOR TYING COILS

[75] Inventors: Harold T. Fields, Fort Wayne; Richard J. Habegger, Grabill, both of Ind.

[73] Assignee: General Electric Company, Fort Wayne, Ind.

[22] Filed: Feb. 20, 1973

[21] Appl. No.: 333,495

[52] U.S. Cl. ............................ 29/203 D, 29/205 D
[51] Int. Cl. ..................... H05k 13/00, H02k 15/00
[58] Field of Search............. 29/203 D, 606; 66/1 R; 112/2

[56] References Cited
UNITED STATES PATENTS
2,580,871  1/1952  Wirtz .................................. 66/1 R
2,883,949  4/1959  Amman ................................. 112/2
3,050,019  8/1962  Muskulus.............................. 112/2
3,659,337  5/1972  Gawthrop et al............ 29/203 D X

*Primary Examiner*—Thomas H. Eager

[57] ABSTRACT

Apparatus for lacing the end turns of dynamoelectric machine field coils is provided with a mechanism for skipping a predetermined number of stitches. The stitch-skipping mechanism includes a clutch-brake for selectively coupling the stitching apparatus drive shaft to the stator core indexing drive shaft and a control system which compensates for shaft alignment errors caused by non-instantaneous response and action of the clutch-brake thereby to assure the existence of a desired angular relationship between the two shafts.

19 Claims, 9 Drawing Figures

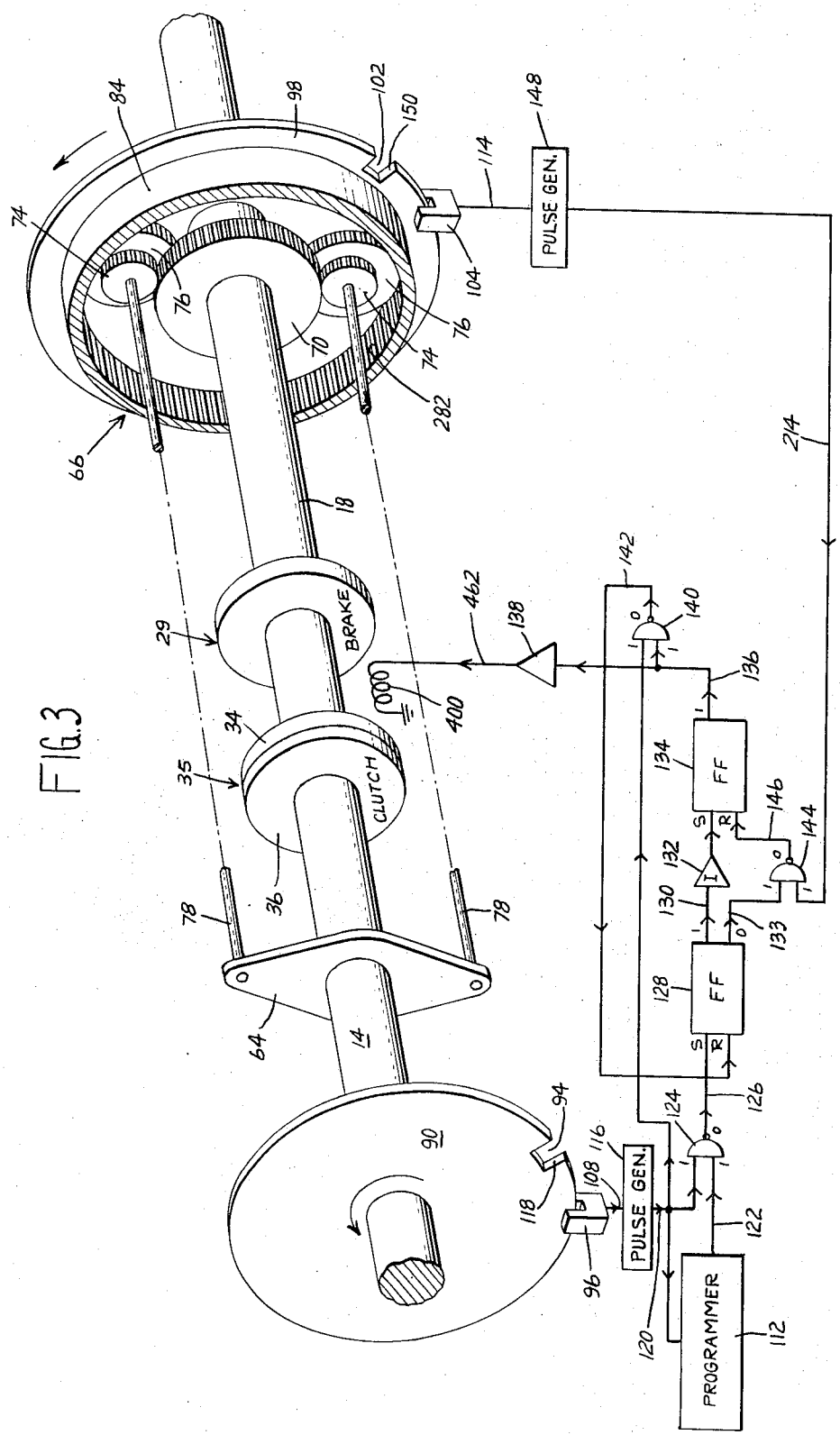

APPARATUS FOR TYING COILS

BACKGROUND OF THE INVENTION

This invention relates generally to a mechanism for maintaining a desired angular alignment between two shafts that are selectively coupled together and, more particularly, to apparatus for stitching or lacing the end turns of dynamo-electric machine field coils that is provided with such a mechanism and which may be used to advantage for selectively skipping one or more stitches.

U. S. Pat. No. 3,659,337 to Roy. E. Gawthrop and Lowell M. Mason, assigned to the assignee of the present application, discloses apparatus for lacing the end turns of dynamoelectric machine field coils. In the use of such lacing apparatus, there are occasions due to a particular end turn configuration or pattern when it is desirable to skip or omit one or more stitches.

Previous types of lacing apparatus employ a first shaft which drives a lacing or tying mechanism and a second shaft which drives an indexing mechanism, the two shafts being driven in unison thereby to drive the tying mechanism in synchronism with the indexing mechanism. Typically, a wound stator is periodically indexed, and a stitch is formed or taken on the field coil between indexes of the stator. In order to skip a predetermined number of stitches in apparatus of this type, it would be necessary to decouple the tying mechanism drive shaft and to stop the same while the indexing mechanism drive shaft continues to rotate and index a stator core; and thereafter to recouple the tying mechanism drive shaft to the indexing mechanism drive shaft. It would also be necessary, in order to maintain synchronism between the tying mechanism and the indexing mechanism following such recoupling, that the two shafts have generally the same angular relationship that they had prior to decoupling. If the speed of the two shafts were sufficiently slow and/or the inertia of the tying mechanism sufficiently low, a simple dog-type clutch might be employed to provide the desired angular relationship of the two shafts upon recoupling. However, in the case of at least some apparatus, (e.g., apparatus such as that of the Gawthrop and Mason patent), the shaft speed and inertia could be sufficiently high to dictate a "soft start" of the tying mechanism drive shaft. Such a soft start could be provided by slippage of a clutch-brake mechanism. However, such slippage upon recoupling combined with slippage at the time of decoupling would provide a totally random angular relationship of the two shafts after recoupling. This in turn could result in the stitching mechanism being located in interfering relation with the stator windings during an index of the core and resultant damage to the apparatus as well as to the stator assembly being laced. It would therefore be desirable to provide means that would compensate for any shaft misalignment, including that caused by clutch-brake slippage, thereby to provide and maintain a desired predetermined angular relationship of the two shafts when they are coupled together.

SUMMARY OF THE INVENTION

It is accordingly an object of the present invention to provide new and improved tying or lacing apparatus having means for skipping a predetermined number of stitches while lacing dynamoelectric machine field coil end turns.

Another object of the present invention is to provide new and improved apparatus, for lacing dynamoelectric machine field coil end turns, whereby skipping one or more stitches is facilitated and whereby a predetermined desired angular relationship of the stitching apparatus and indexing apparatus drive shafts are provided upon recoupling the same for resumption of normal stitching operations.

A more specific object of the present invention is to provide a new and improved arrangement whereby two shafts, intended to be in predetermined alignment when coupled together, may be selectively decoupled and recoupled while maintaining such desired alignment.

In carrying out the above and other objects in one form, we provide apparatus for tying cord on the end turn portions of coils projecting beyond the side surface of a magnetic core which includes means for supporting the core with the coils therein, stitching or lacing means for tying the end turn portions, a first rotatable shaft coupled to stitching means for driving the same, means for periodically indexing the supporting means and core thereby to advance the end turns sequentially to tie the same, a second rotatable shaft coupled to the indexing means for driving the same, and means for skipping a predetermined number of stitches in a given operational cycle of the apparatus. In an exemplification illustrated herein, we provide apparatus that includes: selectively actuatable clutch means for normally coupling a second shaft to a first shaft thereby to drive the same and stitching means coupled therewith in synchronism with indexing means; and selectively actuatable brake means coupled to the first shaft for stopping the same when the clutch means is deactuated. Interconnecting means are also provided which may be in the illustrated form of a planetary gear train. This gear train includes a sun gear, planet cage, and ring gear elements, with one of the elements being coupled to the first shaft and driven thereby, and another of the elements being coupled to the second shaft and driven thereby. First signal means is provided coupled to the second shaft and rotatable therewith for indicating the angular position of the second shaft with respect to a first reference point, and first response means is provided for sensing passage of the first indicating means past the first reference point. Second signal means is provided coupled to the remaining one of the planetary gear train elements and rotatable therewith for indicating the angular position of the remaining element with respect to a second reference point, and second response means is provided for sensing passage of the second indicating means past the second reference point. Control means is provided including first circuit means coupled to the first response means for deactuating the clutch means and actuating the brake means in response to an initial passage of the first signal means past the first reference point. We also provide counting means coupled to the first response means for counting a predetermined number of revolutions of the first signal means following its initial passage; and second circuit means coupled to the second response means and to the counting means for actuating the clutch means and deactuating the brake means when the second signal means passes the second reference point following completion of the predetermined number of revolutions.

BRIEF DESCRIPTION OF THE DRAWINGS

Our invention itself, however, both as to its organization and preferred embodiments thereof, together with other features and objects, along with manners of attaining them will become more apparent and better understood by reference to the following description taken in conjunction with the accompanying drawings.

The subject matter which we regard as our invention is particularly pointed out and distinctly claimed in the concluding portion of the specification.

In the drawings:

FIG. 1 is a side cross-sectional view showing a stitch-skipping mechanism in apparatus embodying the invention in one form thereof;

FIG. 2 is a cross-sectional view taken along the line 2—2 of FIG. 1;

FIG. 3 is a somewhat schematic exploded perspective view of portions of the arrangement of FIG. 1 and further showing, in more detail, a control system for skipping a stitch;

Figure 1:
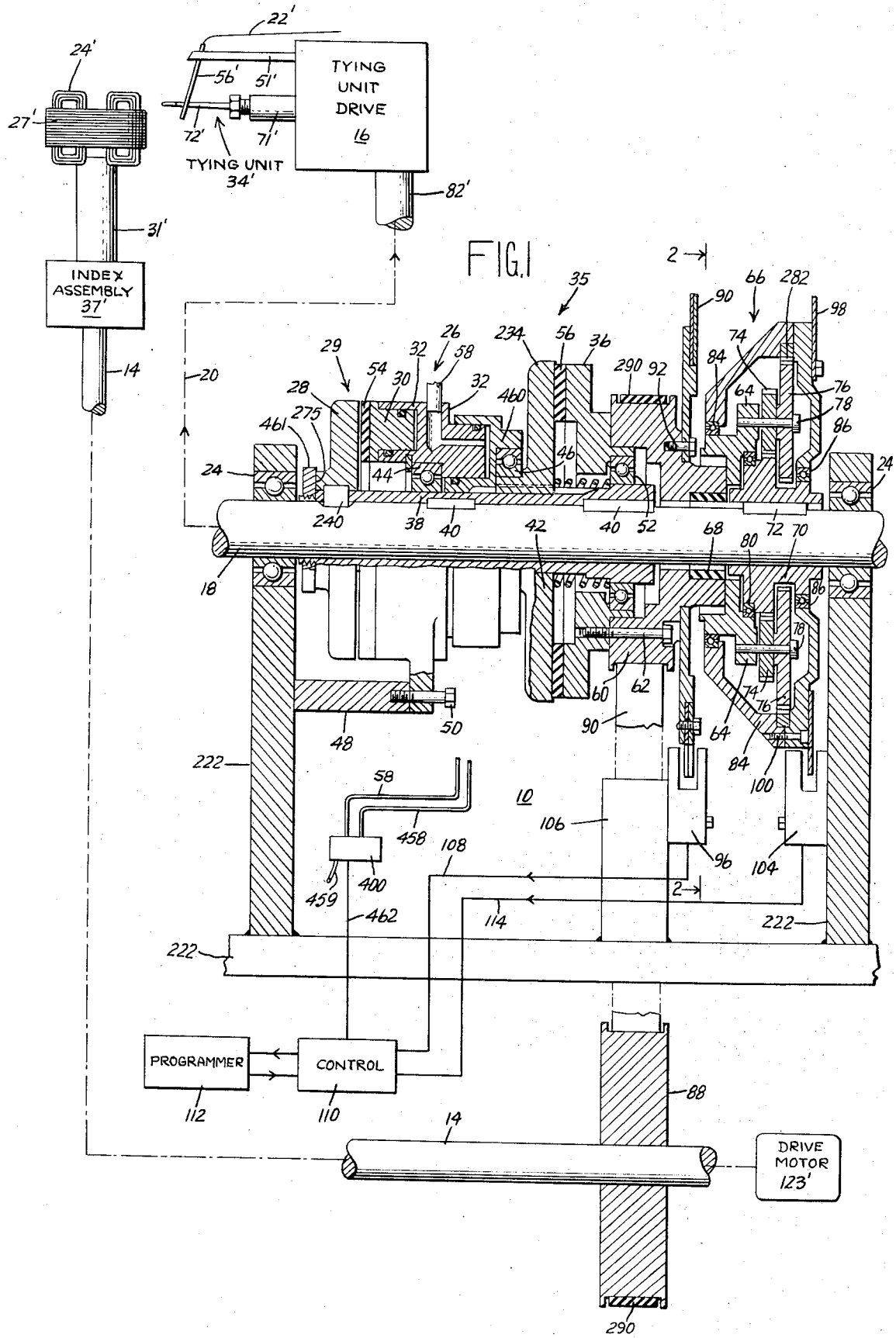
Figure 5:
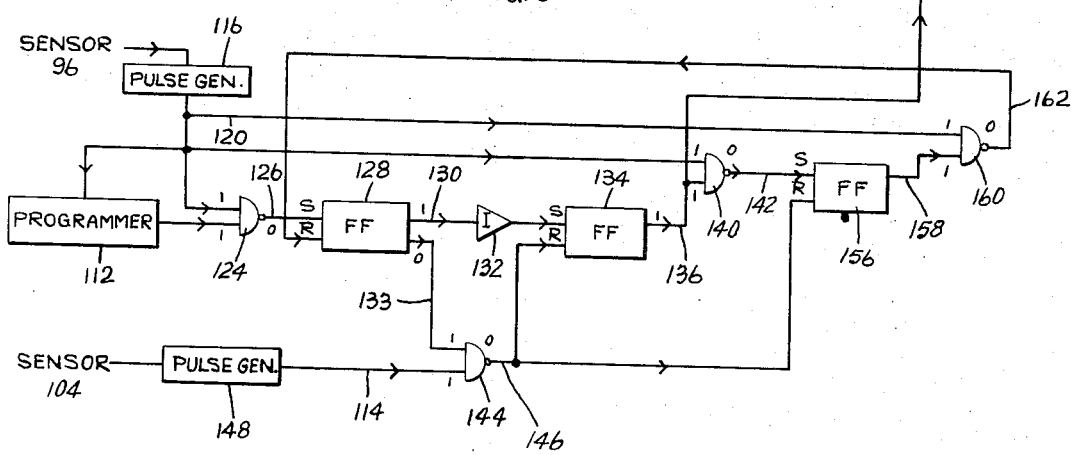

FIG. 4 A-E are diagrams useful in explaining the mode of operation of the stitch-skipping mechanism of FIG. 1; and FIG. 5 is a schematic diagram showing a control system for skipping two stitches.

DESCRIPTION OF THE PREFERRED EMBODIMENT

Figure 2:
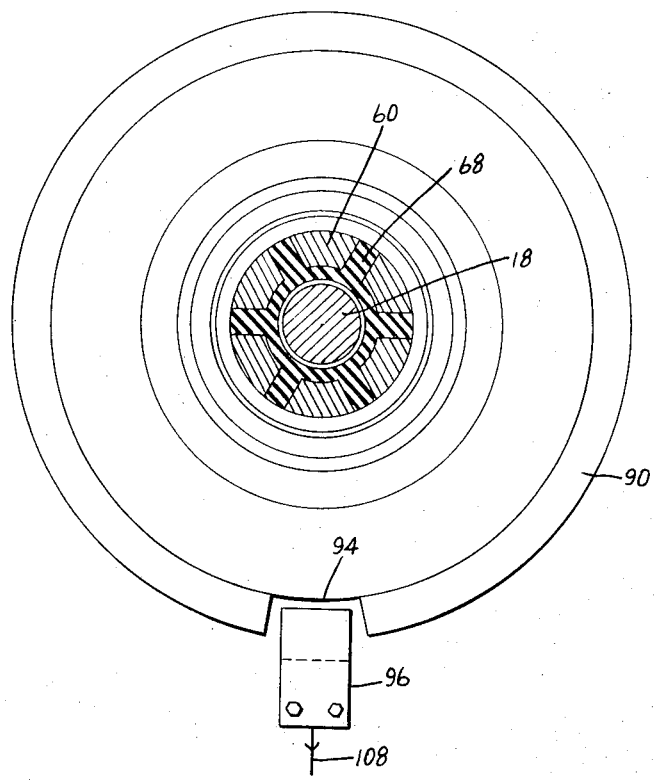

Referring now to FIGS. 1 and 2 of the drawing, we have shown lacing apparatus generally indicated at 12 that includes a stitch-skipping mechanism generally indicated at 10. Much of the detail of apparatus 12 is described in full in the aforesaid Gawthrop and Mason patent, the entire disclosure of which patent is incorporated herein by reference. To facilitate correlation between the apparatus 12 and apparatus specifically described in the Gawthrop and Mason patent, primed reference numerals are used herein to indicate the same structure or elements as in the incorporated by reference patent.

As more fully shown and described in the aforesaid Gawthrop and Mason patent, stator core 27' is supported on core holder assembly 31' and rotatably advanced by index assembly 37' driven by drive shaft 14. Field coil end turn portions 24' are laced or tied with cord 22' by tying unit 34' which includes members 51', 56', and tying or hook member 72' mounted on member 71'. Tying unit 34' is actuated by tying unit drive 16 driven by rotatable shaft 82'. Since lacing apparatus 12 is fully illustrated and described in the aforesaid Gawthrop and Mason patent, further description thereof would be redundant and is not repeated herein.

The mechanism 10 comprises shaft 18, directly coupled to tying unit drive shaft 82', as shown by dashed line 20, shaft 18 being rotatably supported in frame 222 by bearings 24. Clutch-brake assembly 26 is mounted on shaft 18 and comprises brake assembly 29 including brake disc 28 and non-rotatable brake member 30 which is movable axially toward and away from brake disc 28, relative to member 32. Clutch-brake assembly 26 also includes clutch assembly 35 which comprises clutch disc 234 and clutch member 36. Brake disc 28 is drivingly secured to sleeve 38 and shaft 18 (by key 240) for rotation therewith. Sleeve 38 also is drivingly connected to shaft 18 by keys 40.

Although numerous clutch-brake assemblies may be purchased or designed, and electro-magnetic units may be used; the assembly 26 is an air operated Clutch-Brake-Sheave assembly marketed by Horton Manufacturing Co., Inc., of Minneapolis, Minnesota under the tradename "AIR CHAMP." The particular mode designation of the assembly 26 was Horton's Model No. HWCB.

As will be understood, when air is supplied from valve 400 to line 58, the clutch portion of assembly 26 will be engaged and the brake portion will be disengaged. On the other hand, when high pressure air is connected via supply line 459 and valve 400 to line 458 and thence to a not shown "brake" port on assembly 26, the clutch will disengage and the brake portion will become operative to brake and stop shaft 18.

The non-rotatable or stationary brake member 30 is movable axially relative to sleeve 38 and, flange 42 of clutch disc 234 is also axially movable along a splined portion of sleeve 38. Bearings 44, 46 permit relative rotation between member 32 and sleeve 38; and clutch actuating member 460 and clutch disc 234, respectively.

Brake member 32 is secured to frame 222 as by bracket 48 and threaded fastener 50 so as to hold brake member 30 stationary, but the length of fastener 50 permits some axial movement of the brake components axially relative to sleeve 38. Clutch disc 234 is drivingly secured to sleeve 38 by means of a spline as above mentioned, and clutch member 36 is supported for rotation relative to sleeve 38 by bearing 52.

The clutch-brake assembly 26 may be fixedly secured to sleeve 38 by being welded thereto or with other suitable means such as, e.g., set screws. However, in the case of the structure actually shown in FIG. 1; sleeve 38 is provided with a threaded portion at the left hand end thereof (as viewed in FIG. 1) and a conventional nut 461 is threaded against the face 275 of brake disc 28.

Brake facing material 54 is disposed between brake disc 28 and brake member 30; and clutch facing material 56 is disposed between clutch disc 234 and clutch member 36.

Clutch member 36 is secured to pulley or sheave 60 that also is a part of the purchased assembly 29. These parts are secured for movement together, e.g., by threaded fasteners 62 or by being fabricated as a unitary structure. Pulley 60 is drivingly coupled to planet cage 64 of planetary gear train 66 by resilient coupling 68, sometimes referred to as a LOVEJOY or BOSTON coupling.

Sun gear 70 of planetary gear train 66 is secured to shaft 18 by key 72. Planet gear clusters 74, 76 are each rotatably mounted on a shaft 78. Shafts 78 in turn are secured to planet cage 64. Planet cage 64 is rotatably mounted on sun gear 70 by bearing 80. Planet gears 74 mesh with sun gear 70 and planet gears 76 mesh with ring gear 282 mounted in housing 284 which is rotatably mounted on planet cage 64 and sun gear 70 by bearings 84, 86.

Index assembly drive shaft 14 is driven by drive motor 123'. Pulley 88 on shaft 14 is drivingly coupled to pulley 60 by belt 290. The diameters of pulleys 88 and 60 are the same, so that the speed of shaft 18 will be the same as the speed of shaft 14 when the brake is released, and the clutch is engaged.

It will now be seen that when brake 29 is deactuated and clutch 35 is actuated; rotation of shaft 14 by drive motor 123' will result in rotation of clutch plate or disc 234 and shaft 18, the entire planetary gear train 66 being locked so that ring gear 282 and housing 84 rotate at the same speed as shaft 18. It will further be seen that when clutch 35 is deactuated and brake 29 is actuated, shaft 18 will stop. When shaft 18 stops, sun gear 70 is stopped, but planet cage 64 is driven by pulley 60 through coupling 68. This driving or rotation of cage 64 causes ring gear 282 to rotate with respect to the now-stationary shaft 18 and sun gear 70 at a speed determined by the speed of cage 64 and the overall gear ratio provided between sun gear 70 and ring gear 282. In one specific embodiment of the invention, pulleys 60 and 88 have a one-to-one ratio so that pulley 60 and shaft 18 are normally driven at the same speed as shaft 14; and the gear ratio of planetary gear train 66 is such that ring gear 282 and housing 284 are driven at twice the speed of pulley 60 when shaft 18 is stationary.

A first timing disc 90 is secured to pulley 60 (by means of threaded fasteners 92) and thus rotates at the same speed as shaft 14 at all times. Timing disc 90 is formed of conductive material, has a notch 94 formed therein, and cooperates with a first pickup or sensor device 96. A second timing disc 98 is secured to ring gear housing 84 (by means of threaded fasteners 100) and thus rotates at the same speed as ring gear 282. Timing disc 98 is formed of conductive material, has notch 102 therein (see FIG. 3), and cooperates with a second pickup device or sensor 104. Sensor 96 is mounted on bracket 106 attached to frame 222 and sensor 104 is also mounted on frame 222. Sensors 96, 104 are aligned in a plane that includes the axis of rotation of shaft 18. In a specific embodiment, sensors 96, 104 were Dynapar Pickups Model 58A marketed by Dynapar Corp., of 1675 Delaney Road, Gurnee, Illinois.

The output of sensor 96 is coupled by circuit means 108 to a control 110 and through control 110, to programmer 112. Sensor 104 is coupled by circuit means 114 to the control 110. Control 110 is operatively connected so as to control the selective operation of the clutch-brake 26 by selectively applying a voltage via circuit means 462 to the solenoid coil of the spring loaded 4 way solenoid valve 400. In one actual embodiment, valve 400 was a model IJSA4W valve marketed by Numatics, Inc., of Highland, Michigan.

Referring now additionally to the schematic presentation of FIG. 3, it will be seen that functionally, shaft 14 drives planet cage 64 and thus planet gear clusters 74, 76 of the planetary gear train 66. Shaft 14 also drives shaft 18 when clutch 35 is engaged (i.e., actuated) and brake 29 is deactuated. Sensor 96 provides a "one" output when disc 90 is passing thereby and a "zero" output when notch 94 is passing thereby. Pulse generator 116, which forms part of control 110 and which may be a one-shot multivibrator is coupled to output circuit means 108 of sensor 96 and provides a "one" level pulse of short duration in response to passage of trailing edge 118 of notch 94 of disc 90. It will thus be seen that one such short duration pulse is provided in response to each revolution of disc 90.

Output circuit means 120 of pulse generator 116 is coupled to the programmer 112 which may comprise a conventional pulse counting circuit or shift register which, in turn, provides a "one" level signal in its output circuit means 122 after a predetermined number of revolutions of disc 90 in a given lacing cycle. It will be after this predetermined number of revolutions that "skipping" of one or more stitches will occur.

Output circuit 120 means of pulse generator 116 and output circuit means 122 of programmer 112 are coupled to NAND gate 124 which has its output circuit means 126 coupled to the "set" input circuit of flip-flop 128. Coincidence of a "one" pulse provided by pulse generator 116 (in response to passage of trailing edge 118 of notch 94 of disc 90), with a "one" level signal from programmer 112 (in response to completion of a predetermined number of revolutions of disc 90 on shaft 14), will result in a "zero" level signal in output circuit means 126 of NAND gate 24 and this sets flip-flop 128. This setting of flip-flop 128 results in a "one" level signal in its output circuit means 130 and a "zero" level signal in its output circuit means 133. Inverter 132 couples output circuit means 130 of flip-flop 128 to the "set" circuit means of flip-flop 134. Appearance of a "one" level signal in output circuit means 130 of flip-flop 128 results in a "zero" level signal from inverter 132 that "sets" flip-flop 134. This in turn results in the appearance of a "one" level signal in the output circuit means 136 of flip-flop 134. Output circuit means 136 of flip-flop 134 is coupled by amplifier 138 to the circuit means 462 are coupled to the solenoid valve that in turn results in declutching of shafts 14 and 18, and braking of shaft 18.

Passage of trailing edge 118 of notch 94 of disc 90 past sensor 96 coincident with programmer 112 calling for the skipping of a stitch results in setting flip-flops 128 and 134 and resultant energization of clutch-brake 29 so as to deactuate clutch 35 and actuate brake 29. As explained above, this decouples shaft 18 from shaft 14 and stops rotation of shaft 18. Stopping of shaft 18 results in planetary gear train 66 rotating disc 98 at a speed different than the rotational speed of shaft 14 which is also the speed of pulley 60. As is also mentioned above, in one specific embodiment, the speed of cage 84 and disc 98 is twice the speed of pulley 60 (or shaft 14) when shaft 18 is stationary.

Output circuit means 136 of flip-flop 134 and output circuit means 120 of pulse generator 116 are also coupled to NAND gate 140 which has its output circuit means 142 coupled to the "reset" input circuit means of flip-flop 128. When a "one" level signal appears in output circuit means 136 of flip-flop 134 (resulting from setting of flip-flop 134) and is applied to NAND gate 140, the short duration pulse provided by pulse generator 116 which caused setting of flip-flop 134 (which as above described is of short duration) will have ended, so a "one" level signal remains in output circuit means 142 of NAND gate 140.

After one complete revolution of shaft 14 and disc 90 is sensed (due to the next passage of trailing edge 118 of notch 94 past sensor 96) pulse generator 116 provides another short duration pulse in its output circuit means 120 which is applied to NAND gate 140. This results in a "zero" level signal in the output circuit 142 of NAND gate 140 and this signal then resets flip-flop 128. Resetting of flip-flop 128 results in appearance of a "one" level signal in its output circuit means 133.

Output circuit means 114 of sensor 104 and output circuit means 133 of flip-flop 128 are coupled to NAND gate 144 having its output circuit means 146 coupled to the "reset" input circuit means of flip-flop 134. It will thus be seen that in the illustrated embodiment, wherein it is desired to skip one stitch during one revolution of shaft 14, NAND gate 140 comprises a counting circuit for counting one revolution of shaft 14 and disc 90.

The output circuit means 114 of sensor 104 is coupled to pulse generator 148 and a "one" pulse of short duration appears in output circuit means 214 (of pulse generator 148) in response to passage of trailing edge 150 of notch 102 of disc 98 past sensor 104. It will now be seen that the first passage of trailing edge 150 of notch 102 past sensor 104 following completion of one revolution of disc 90 will result in generation of the short duration "one" pulse signal by pulse generator 148 and this signal is applied to NAND gate 144 along with a "one" level signal in output circuit means 133 of flip-flop 128 (this "one" level signal in circuit means 133 having been caused by resetting flip-flop 128 as previously described). Coincidence of the "one" level signal in output circuit means 133 of flip-flop 128 and the "one" pulse in output circuit means 214 results in a "zero" level signal in output circuit means 146 of NAND gate 144. This in turn resets flip-flop 134 so as to terminate the "one" level signal in its output circuit means 136. When this occurs, clutch-brake 29 is de-energized so as to actuate clutch 35 and deactuate brake 29 whereupon shafts 14 and 18 are recoupled.

Figure 4A:
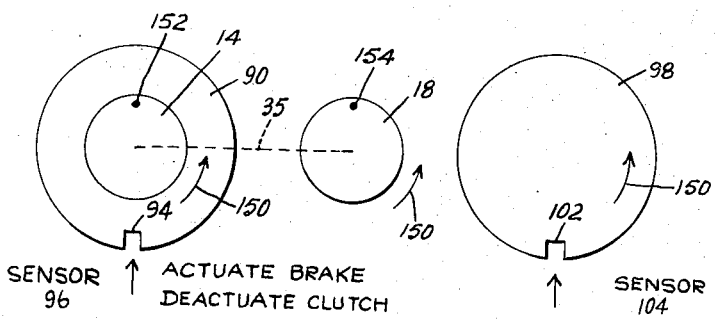

Referring now to FIG. 4A, the shafts 14, 18 are shown schematically as being coupled by clutch 35, and it is assumed that notch 102 in disc 98 is in angular alignment with notch 94 in disc 90. With clutch 35 actuated, the shaft 14 and its disc 90, the shaft 18, and the dics 98 will all be rotating at the same speed and in the same direction, as shown by arrows 150. It is further assumed that at this point programmer 112 calls for skipping one stitch and thus that brake 29 is actuated and clutch 35 deactuated, as above described. At this point in time, just before declutching, point 152 in shaft 14 and point 154 in shaft 18 will be in axial alignment.

Figure 4B:
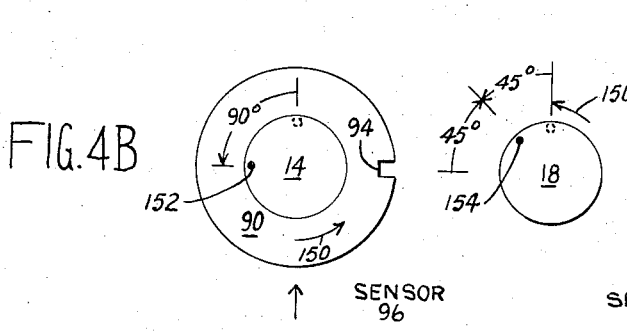

Referring now to FIG. 4B, shaft 14 and disc 90 are shown with point 152 rotated by ninety degrees in the direction of arrow 150 after declutching and braking has occurred. However, due to non-instantaneous response of the clutch-brake and slippage of brake 29, shaft 18 was not instantaneously stopped with its point 154 in a position as shown in FIG. 4A. In other words, shaft 18 will have rotated or "drifted" some amount in the direction of arrow 150 before stopping. This amount of "drift" of shaft 18 is illustrated in FIG. 4B as an exaggerated angular amount, for purposes of discussion, assumed to be about 45°; but in actual practice with a shaft 14 speed of about 120 RPM we have found that such drift would be at most no more than about 5°. With planetary gear train 66 having a two-to-one gear ratio, if shaft 18 had been stopped instantaneously with point 154 at the position shown in FIG. 4A, the disc 98 (coupled to shaft 14 through the gear train) would have rotated 180° as shaft 14 rotated 90°. However, due to the aforesaid assumed 45° drift of shaft 18, notch 102 will have rotated 45° less than 180°, as shown.

Figure 4C:
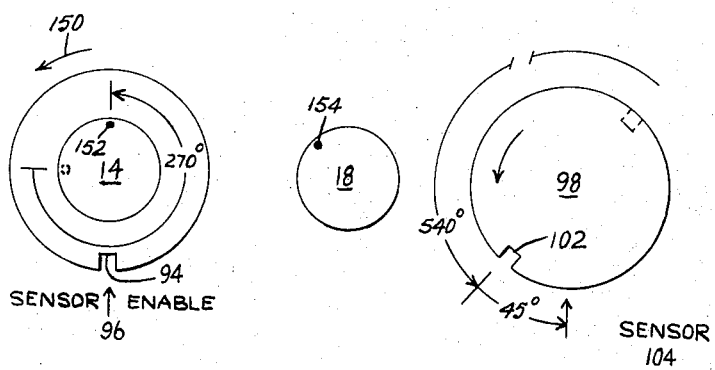

Referring now to FIG. 4C, shaft 14 and the disc 90 are shown after one complete revolution at which time NAND gate 140 resets flip-flop 128, as above described. Shaft 18 remains stationary however, in the same position as shown in FIG. 4B, while the disc 98 has moved one and one-half revolutions, i.e., it has rotated 540° from its position as shown in FIG. 4B. In other words, disc has moved through an angle that is twice the 270° of rotation that shaft 14 has undergone to its position in FIG. 4C from its position shown in FIG. 4B. It will be observed that an additional 45° rotation of the disc 98 would bring notch 102 into alignment with the sensor 104.

Figure 4D:
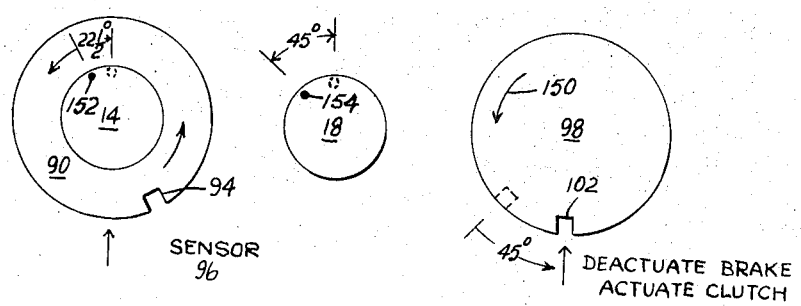

Referring now to FIG. 4D, the disc 98 is shown with notch 102 rotated by 45° from the position shown in FIG. 4C into alignment with the sensor 104 at which point flip-flop 134 is reset and the clutch-brake is energized to deactuate the brake and actuate the clutch as above described. This 45° rotation of the disc 98 in direction 150 corresponds of course to 22½° of rotation of the shaft 14 from the position thereof shown in FIG. 4C. Shaft 18 of course has remained stationary up to the point in time at which the clutch is re-engaged and the brake is released.

Figure 4E:
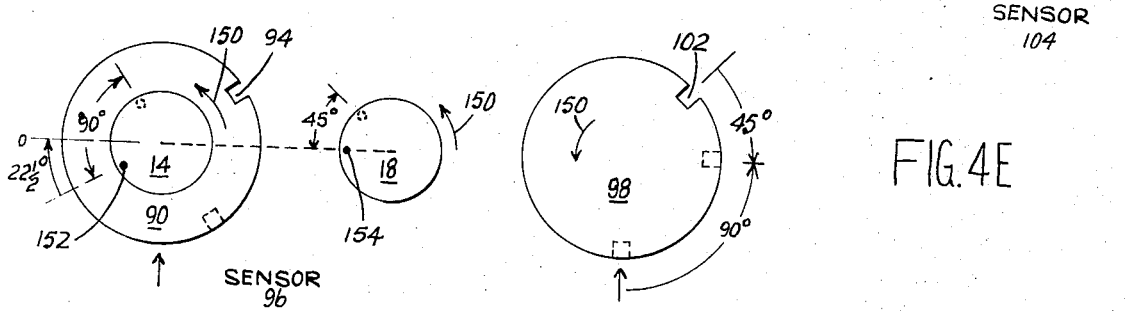

Referring now to FIG. 4E, the shaft 14 is shown rotated by a further 90° from the position shown in FIG. 4D. If brake 29 had instantaneously disengaged, and clutch 35 had instantaneously engaged, without slippage, point 154 on shaft 18 would have rotated by 90° from the position shown in FIG. 4D. However, due to slippage of clutch 35, non-instantaneous response and so forth, point 154 on shaft 18, in reality, rotates by a lesser amount that is again assumed to be an exaggerated amount of 45°. Thus, point 154 on shaft 18 will be only 22-½° from being in axial alignment with point 152 on shaft 14 following re-engagement of clutch 35 and disengagement of brake 29. This is one-half of the initial 45° misalignment or "drift" caused by clutch-brake slippage that occurred at the beginning of the sequence of events described above, commencing with reference to FIG. 4A. It will be understood by persons skilled in the art that if clutch 35 had been instantaneously engaged and brake 29 instantaneously disengaged when notch 102 was aligned with sensor 104 in FIG. 4D, the 90° rotation of shaft 14 would have been accompanied by a 90° rotation of disc 98. However, the aforementioned slippage of clutch 35, among other things, results in notch 102 being rotated by an amount corresponding to the amount of assumed movement of shaft 18, i.e., 45°.

As will be further explained below, the 22-½° angular error which remained at the conclusion (FIG. 4E) of the first stitch-skipping sub-cycle of operation will further be reduced by one-half during each successive stopping of shaft 18 and each successive starting of shaft 18 after the initial stitch-skipping operation of the illustrated apparatus, and thus approach zero after a very few number of starts and stops of shaft 18.

It is to be clearly understood that the 45° slip assumed in FIG. 4A-E for purposes of description is extremely exaggerated and that in actual apparatus embodying the invention, the "drift" and slippage above referred to is much less. In an actual embodiment of the invention in which the speed of the shaft 14 was about 120 RPM, the largest initial angular error between the shafts 14 and 18 following the first stitch-skipping operation was only about 5° (indicating a "drift" or slip on the order of about 10°). That 10° error was substantially reduced to zero in the next three stitch-skipping operations.

It can be shown that the amount of correction during each stitch-skipping operation can be varied by varying the gear ratio of planetary gear train 66. For example, if the gear ratio is made greater than two-to-one, the mechanism will correct a smaller part of the error during each operation; and if the ratio is made greater than two-to-one, a greater part of the error will be corrected.

Referring now to FIG. 5 in which like elements are indicated by like reference numerals and similar elements by primed reference numerals, a modified control system is shown which will provide for skipping two stitches. Here, output circuit means 142 of NAND gate 140 is coupled to the "set" input circuit means of flip-flop 156. Output circuit means 158 of flip-flop 156 and output circuit means 120 of pulse generator 116 are coupled to NAND gate 160 which has its output circuit means 162 coupled to the reset input circuit means of flip-flop 128. Output circuit means 146 of NAND gate 144 is coupled to the "reset" input circuit means of flip-flop 134 and also to the "reset" input circuit means of flip-flop 156.

Inspection of FIG. 5 will reveal that the second pulse provided by pulse generator 116 (i.e., the first pulse following the initial pulse) will result in setting flip-flop 156, and that the third pulse (i.e., the second pulse after the initial pulse) will result in resetting flip-flop 128. The first pulse provided by pulse generator 148 in response to passage of trailing edge 150 of notch 102 of the disc 98 past the sensor 104 following resetting of flip-flop 128, will reset flip-flops 134 and 156 and thus result in deenergizing the clutch-brake, as above-described. It will be understood that NAND gates 140, 160 and flip-flop 156 comprise a two-stage counter and that the system can readily be modified to provide for skipping additional stitches by merely adding additional counting stages.

As explained below (with planetary gear train 66 having a two-to-one ratio so that with shaft 18 and sun gear 70 locked against rotation, ring gear 282 will run at twice the speed of pulley 60), during each stitch-skipping operation the apparatus hereinabove described will correct one-half of the error in alignment of shafts 14 and 18 caused by the initial slippage of the clutch-brake mechanism 35, 29 that occurs the first time that shaft 18 is stopped. When shaft 18 starts again, this "initial" error is reduced by one-half. Thereafter, each time that shaft 18 starts and each time that shaft 18 stops, any existing error in alignment between shafts 14 and 18 will be reduced by one-half.

A mathematical explanation and analysis of the relative motions and operation of shafts 14, 18 and discs 90, 98 will now be presented that proves the statements just made concerning correction of shaft alignment error.

Referring now to FIG. 4A, and assuming initial conditions with the brake disengaged, the clutch engaged, and the machine running:

$$W_O = W_A = W_B = \text{a constant,}$$

where:

$W_A =$ (Angular velocity of shaft 14 and notch 94 of disc 90, referred to as flag "A")

$W_B =$ Angular velocity of shaft 18

$W_O =$ (Angular velocity of notch 102 of disc 98, referred to as flag "B")

For purposes of the ensuing discussion, the following definitions will be used.

A = Number of teeth of sun gear 70
B = Number of teeth of planet gears 76
C = Number of teeth of planet gears 74
D = Number of teeth of ring gear 282
$\theta_A =$ (Angular position of shaft 14 with respect to Sensor 96 (ground))
$\theta_B =$ (Angular position of shaft 18 with respect to Sensor 104 ground
$\theta_S =$ (Intial angular slip of shaft 18 with respect to Sensor 104 (ground))
$\theta_O =$ (Angular position of flag "B" with respect to Sensor 104 (ground))
(A B/C D) = Ratio of number of gear teeth in the planetary train
$t_s =$ (time from signal to deactuate clutch and actuate brake until $W_B = O$ occurs, i.e., until shaft 18 stops)

Rotation and direction shown by arrow 150 in FIGS. 4A - 4E is positive (+) and rotation in the opposite direction is negative (−).

Flags "A" and "B" initially will simultaneously pass through sensors 96 and 104, until the programmer (see FIGS. 3 and 5) calls for skipping of one or more stitches so that the next time flag "A" passes sensor 96, flag "A" provides a signal for clutch 35 to be declutched or deactuated and brake 29 to be actuated, as above described. However, since the clutch-brake action does not occur instantaneously, i.e., slip, occurs, shaft 18 does not stop instantaneously, but does stop after time $t_s$ and at that instant, $W_B = O$. Due to non-instantaneous response of the clutch-brake; shaft 18 continues rotating an angular amount $\theta_B$ during the time $t_s$ and at time $t_2$; $\theta_B = \theta_S$.

Then, due to rotation of shaft 18 due to "slip" or "drift", flag "B" will rotate from its initial position an amount, relative to ground, of:

$$-\theta_S \text{ (A B/C D)}$$

However, flag "B" also will move relative to ground due to rotation of shaft A, and this component of rotation of flag "B," relative to ground will be:

$$W_A t_s + W_a t_s \text{ (A B/C D)} = W_A t_s \text{ (1 + A B/C D)}$$

Therefore, the actual position of flag "B" relative to ground ($\theta_O$) at time $t_s$ will be the sum of the just described motions and will be:

$$\theta_O = -\theta_S \text{ (A B/C D)} + W_A t_s \text{ (1 + A B/C D)}$$

Also:

$$\theta_A = W_A t_s; \text{ at time } t_s$$

and $$\theta_B = \theta_S; \text{ at time } t_s$$

Therefore, the condition of the system at time "$t_s$" is:

$$W_A = \text{constant}$$
$$W_B = 0$$
$$W_O \times W_A (1 + AB/CD)$$

This condition continues to exist for a period of time to permit skipping of a stitch. Then, when flag "B" next passes sensor 104 (i.e., the second revolution for flag "B" when only one stitch is being skipped); a signal is suppled to control 110 and at this instant;

$$\theta_O = 0$$
$$\theta_B = \theta_S$$
$$\theta_A = \frac{2}{\left(1 + \frac{AB}{CD}\right)} + \frac{\theta_S \left(\frac{AB}{CD}\right)}{\left(1 + \frac{AB}{CD}\right)} - W_A t_s - 1 + W_A t_s$$

Simplifying, and substituting $AB/CD = 1$ for the apparatus shown in FIG. 1;

$$\theta_A = 1/2 \; \theta_S$$

Therefore, at this instant, the difference in location of shafts 14 and 18 is $\theta_B - \theta_A = \theta_S - 1/2 \; \theta_S = 1/2 \; \theta_S$ Therefore the initial displacement or error in shaft alignment is reduced by one-half at this instant. However, shaft 18 does not instantaneously come up to speed; but at the instant that shaft 18 does come up to speed, until time $t_p$ has elapsed from the instant that flap "B" passed sensor 104, and at time $t_p$:

$$W_B = W_A$$
$$\theta_A = \frac{\theta_S \left(\frac{AB}{CD}\right)}{\left(1 + \frac{AB}{CD}\right)} + W_A t_p$$

$\theta_B = \theta_S + \theta_{BS}$; where $\theta_{BS}$ is the rotation of shaft 18 during time $t_p$ $\theta_O = W_A t_p + \theta_P (AB/CD)$; where $\theta_P$ is the difference in rotation of shafts 14 and 18 during time $t_p$.

For some time interval after time $t_p$ has elapsed, shafts 14 and 18 will rotate at the same speed until flag "A" is at sensor 96 and signals that shaft 18 should be stopped so that another stitch can be skipped. At this instant:

$$\theta_A = 0$$

$$\theta_B = \theta_S - \frac{\theta_S \left(\frac{AB}{CD}\right)}{\left(1 + \frac{AB}{CD}\right)} + \theta_{BS} - W_A t_p$$

$$= \theta_S - \frac{\theta_S \left(\frac{AB}{CD}\right)}{\left(1 + \frac{AB}{CD}\right)} + (W_A t_p - \theta_P) - W_A t_p$$

$$= \theta_S - \frac{\theta_S \left(\frac{AB}{CD}\right)}{\left(1 + \frac{AB}{CD}\right)} - \theta_P$$

$$\theta_O = \theta_P \left(\frac{AB}{CD}\right) - \frac{\theta_S \left(\frac{AB}{CD}\right)}{\left(1 + \frac{AB}{CD}\right)}$$

However, recall that shaft 18 does not necessarily stop instantaneously, but that shaft 18 will stop at time $t_Q$ and at that instant:

$$W_B = 0$$
$$\theta_A = W_A t_Q$$
$$\theta_B = \theta_S - \frac{\theta_S \left(\frac{AB}{CD}\right)}{\left(1 + \frac{AB}{CD}\right)} - \theta_P + \theta_{BQ}$$

where $\theta_{BQ}$ is the travel of shaft "B" during time $(t_Q)$, and is analagous to $\theta_S$ from the above discussion.

$$\theta_O = \theta_P \left(\frac{AB}{CD}\right) - \frac{\theta_S \left(\frac{AB}{CD}\right)}{\left(1 + \frac{AB}{CD}\right)} + W_A t_Q$$

$$\left(1 + \frac{AB}{CD}\right) - \theta_{BQ} \left(\frac{AB}{CD}\right)$$

The next instant of interest is when flag "B" is at sensor 104 and signals the start of rotation of shaft 18. At this instant:

$$\theta_A = \frac{-\theta_P \left(\frac{AB}{CD}\right)}{\left(1 + \frac{AB}{CD}\right)} + \frac{\theta_S \left(\frac{AB}{CD}\right)}{\left(1 + \frac{AB}{CD}\right)} 2 + \frac{\theta_{BQ} \left(\frac{AB}{CD}\right)}{\left(1 + \frac{AB}{CD}\right)}$$

$$\theta_B = \theta_S - \frac{\theta_S \left(\frac{AB}{CD}\right)}{\left(1 + \frac{AB}{CD}\right)} - \theta_P + \theta_{BQ}$$

$$\theta_O = 0$$

The actual alignment error between shafts 14 and 18 is equal to $\theta_A - \theta_B$ and, as shaft 18 is repetitively stopped and started, the difference between $\theta_A$ and $\theta_B$ approaches zero, all as should be understood from the above analysis.

It will now be understood that apparatus embodying the invention can maintain a relatively constant relationship between the lacing and indexing assemblies of high speed stator end turn lacing apparatus even though the lacing assembly is disengaged from the indexing assembly in order to skip one or more stitches. When the clutch coupling the lacing the indexing assembly drive shafts is de-energized, the mechanism of the invention substantially instantaneously corrects the error between the actual angular stopping position of the lacing assembly drive shaft and a predefined theoretical stopping position and thus, the lacing and indexing assemblies will be in proper relationship when the clutch is reactuated. The mechanism of the invention thus permits "soft" engagement and disengagement of the lacing assembly from the indexing assembly while compensating for variable clutch-brake engagement and disengagement time.

We have intentionally misaligned shafts 14 and 18 in apparatus embodying the invention and then cycled such apparatus five or six times. When this has been done, the shafts 14 and 18 become realigned after just a few cycles. Of course, it will be understood that theoretically there may be some slight misalignment between shafts 14 and 18; but for all practical purposes;

shafts 14 and 18 will become exactly aligned and thereafter remain in such alignment.

While there have been described above the principles of this invention in connection with specific apparatus, it is to be understood that this description is made only by way of example and not as a limitation to the scope of the invention.

What we claim as new and desire to secure by letters Patent of the United States is:

1. In apparatus for tying cord about end turn portions of coils projecting beyond a side surface of a magnetic core including means for supporting the core with the coils therein, stitching means for tying the end turn portions, a first rotatable shaft coupled to said stitching means for driving the same, means for periodically indexing the supporting means and core thereby to advance said end turns sequentially to tie the same, and a second rotatable shaft coupled to said indexing means for driving the same: mechanism for skipping a predetermined number of stitches comprising selectively actuatable clutch means for normally coupling said second shaft to said first shaft thereby to drive the same and said stitching means in synchronism with said indexing means, selectively actuatable brake means coupled to said first shaft for stopping the same when said clutch means is deactuated, a planetary gear train including sun gear, planet cage and ring gear elements, one of said elements being coupled to said first shaft and driven thereby, another of said elements being coupled to said second shaft and driven thereby, first means coupled to said second shaft and rotatable therewith for indicating the angular position of said second shaft with respect to a first reference point, first means for sensing passage of said first indicating means past said first reference point, second means coupled to the remaining one of said elements and rotatable therewith for indicating the angular position of said remaining element with respect to a second reference point, second means for sensing passage of said second indicating means past said second reference point, and control means including first circuit means coupled to said first sensing means for deactuating said clutch means and actuating said brake means in response to an initial passage of said first indicating means past said first reference point, means coupled to said first sensing means for counting a predetermined number of revolutions of said first indicating means following said initial passage, and second circuit means coupled to said second sensing means and to said counting means for actuating said clutch means and deactuating said brake means responsive to the first passage of said second indicating means past said second reference point following completion of said predetermined number of revolutions.

2. The apparatus of claim 1 wherein said one element is said sun gear, said other element is said planet cage, and said remaining element is said ring gear.

3. The apparatus of claim 2 wherein said sun gear is mounted on said first shaft and is rotatable therewith, said planet cage and ring gear being rotatably mounted on said first shaft; said clutch means including a first clutch element mounted on said first shaft and driven thereby, a second clutch element rotatably mounted on said first shaft and operatively connected to said planet cage, and drive means coupling said second shaft to said second clutch element; said brake means including a first brake element mounted on said first shaft and driven thereby, and a stationary brake element.

4. The apparatus of claim 3 wherein said second clutch element includes a clutch member and a pulley member drivingly connected to said clutch member and planet cage, said drive means comprising an endless, flexible drive element drivingly engaging said pulley.

5. The apparatus of claim 3 wherein said first indicating means is mounted on said second clutch element and said second indicating means is mounted on said ring gear.

6. The apparatus of claim 5 wherein each of said indicating means comprises a disc having a cut-out portion therein, said first and second sensing means sensing passage of the respective cut-out portion thereby.

7. The apparatus of claim 6 wherein said first and second sensing means are aligned in a plane including said first shaft.

8. The apparatus of claim 3 wherein said clutch means and brake means comprise a magnetic clutch-brake having a single operating coil which when energized actuates said brake means and deactuates said clutch means.

9. The apparatus of claim 2 wherein said planetary gear train provides a two-to-one reduction when said brake means is actuated.

10. The apparatus of claim 1 further comprising programming means coupled to said first sensing means and to said first circuit means for enabling the same at a predetermined point in a cycle of operation of said apparatus.

11. In apparatus for tying cord about end turn portions of coils projecting beyond a side surface of a magnetic core including means for supporting the core with the coils therein, stitching means for tying the end turn portions, a first rotatable shaft coupled to said stitching means for driving the same, means for periodically indexing the supporting means and core thereby to advance said end turns sequentially to tie the same, and a second rotatable shaft coupled to said indexing means for driving the same; mechanism for skipping a predetermined number of stitches comprising selectively actuatable clutch means for normally coupling said second shaft to said first shaft thereby to drive the same and said stitching means in synchronism with said indexing means, selectively actuatable brake means coupling to said first shaft for stopping the same when said clutch means is deactuated, a planetary gear train including sun gear, planet cage and ring gear elements, one of said elements being coupled to said first shaft and driven thereby, another of said elements being coupled to said second shaft and driven thereby, means responsive to initial passage of a point on said second shaft past a first reference point for deactuating said clutch means and actuating said brake means, and means responsive to the first passage of a point on said remaining element past a second reference point after a predetermined integral number of revolutions of said second shaft following said second passage for actuating said clutch means and deactuating said brake means.

12. The apparatus of claim 11 wherein said reference points are ground.

13. In apparatus for tying cord about end turn portions of coils projecting beyond a side surface of a magnetic core including means for supporting the core with the coils therein, stitching means for tying the end turn portions, a first rotatable shaft coupled to said stitching means for driving the same, means for periodically indexing the supporting means and core thereby to advance said end turns sequentially to tie the same, and a second rotatable shaft coupled to said indexing means for driving the same; mechanism for skipping a predetermined number of stitches comprising selectively actuatable clutch means for normally coupling said second shaft to said first shaft thereby to drive the same and said stitching means in synchronism with said indexing means, selectively actuatable brake means coupled to said first shaft for stopping the same when said clutch means is deactuated, a mechanism coupled to said first shaft and said second shaft, means responsive to movement of said second shaft for deactuating said clutch means and actuating said brake means, and means for actuating said clutch means and deactuating said brake means.

14. The apparatus of claim 13 wherein said mechanism comprises a gear train.

15. In apparatus for tying cord about end turn portions of coils projecting beyond at least one side surface of a magnetic core including means for supporting the core with the coils therein, stitching means for tying the end turn portions, a first rotatable shaft coupled with said stitching means for driving the same, means for relatively periodically indexing the stitching means and supporting means for the core thereby to relatively position the end turns and stitching means so as to sequentially tie the end turns, and a second rotatable shaft coupled to said means for relatively periodically indexing for driving the same: mechanism for skipping a predetermined number of stitches comprising selectively actuatable clutch means for normally coupling said second shaft to said first shaft thereby to drive the first shaft and the stitching means in synchronism with the means for relatively periodically indexing; selectively actuatable brake means coupled to said first shaft for stopping the same when said clutch means is deactuated; planetary gear train elements including at least one sun gear, at least one planet cage, and at least one ring gear, with one of said elements being coupled with said first shaft for movement therewith and another of said elements being coupled with said second shaft for movement therewith; first indicating means coupled with said second shaft for movement therewith for indicating the angular position of said second shaft with respect to a first reference point; first sensing means for sensing passage of said first indicating means past the first reference point; second indicating means coupled with a remaining one of the gear train elements for movement therewith for indicating the angular position of such remaining one of the gear train elements with respect to a second reference point; second sensing means for sensing passage of the second indicating means past the second reference point; and control means including first circuit means coupled to the first sensing means for deactuating said clutch means and actuating said brake means in response to an initial passage of the first indicating means past the first reference point, means coupled to the first sensing means for counting a predetermined number of passages of the first indicating means following the initial passage; and second circuit means coupled to the second sensing means and to the counting means for actuating said clutch means and deactuating said brake means, in response to the first passage of the second indicating means past the second reference point after the predetermined number of passages of the first indicating means past the first reference point.

16. The apparatus of claim 15 wherein said one element is a sun gear, said another element is a planet cage, and said remaining one of the gear train elements is a ring gear.

17. In apparatus for tying cord about end turn portions of coils projecting beyond at least one side surface of a magnetic core including means for supporting the core with the coils therein, stitching means for tying the end turn portions, a first rotatable shaft coupled with said stitching means for driving the same, means for causing periodic relative indexing movement between the stitching means and the supporting means for a core so as to sequentially tie end turn portions of coils projecting beyond a side surface of the core, and a second rotatable shaft coupled to the means for causing periodic relative indexing movement for driving the same; mechanism for skipping a predetermined number of stitches comprising selectively actuatable clutch means for normally coupling said second shaft with said first shaft thereby to drive the same and said stitching means in synchronism with said means for causing periodic relative indexing movement; selectively actuatable brake means for stopping said first shaft upon clutch means deactuation; a planetary gear train having elements including at least one sun gear, at least one planet cage and at least one ring gear; one of the elements being coupled to said first shaft for movement therewith; another of the elements being coupled to said second shaft for movement therewith; means responsive to an initial position of the second shaft relative to a first reference point for deactuating said clutch means and actuating said brake means; and means responsive to the position of a remaining one of the elements relative to a reference point for actuating said clutch means and deactuating said brake means.

18. In apparatus for tying cord about at least one end turn portion of at least one winding coil projecting beyond at least one side surface of a magnetic core including means for supporting the core with the at least one winding coil accommodated thereby, stitching means for tying the at least one end turn portion, a first driving member coupled with the stitching means for driving the same, means for causing periodic relative indexing movement between the stitching means and supporting means for the core so that the at least one end turn portion may be sequentially tied, and a second driving member coupled with said means for causing relative indexing; a mechanism for skipping a predetermined number of stitches comprising selectively actuatable clutch means for normally coupling said second driving member with said first driving member so as to drive the stitching means in synchronism with said indexing means; selectively actuatable brake means coupled with said first driving member for stopping said first driving member when said clutch means is deactuated; a relative position controlling mechanism coupled with the first driving member and the second driving member; means responsive to a relative position of the second driving member for deactuating the clutch means and actuating the brake means; and means responsive to a relative position of the first driving member for actuating said clutch means and deactuating said brake means; said relative position controlling mechanism comprising means for compensating for errors in alignment between the first and second driving members.

19. The apparatus of claim 18 wherein said means for compensating comprises a mechanical device having a plurality of gear elements.

* * * * *

UNITED STATES PATENT OFFICE
CERTIFICATE OF CORRECTION

Patent No. 3,813,754　　　　　　　Dated June 4, 1974

Inventor(s) Harold T. Fields and Richard J. Habegger

It is certified that error appears in the above-identified patent and that said Letters Patent are hereby corrected as shown below:

In column 4, line 13, change "mode" to --model--.

In column 7, line 40, change "dics" to --disc--.

In column 10, line 17, change "ground)" to --(ground))--.

In column 10, line 44, change "$t_2$" to --$t_s$--.

In column 10, line 49, change "$-\theta_s$" to -- $-\theta_s$--.

In column 10, line 52, change "B," to --"B",--.

In column 10, line 54, change "$W_a t_s$" to --$W_A t_s$--.

In column 10, line 59, change "$-\theta_s$" to -- $-\theta_s$--.

In column 11, line 5, change "$W_O \times W_A$" to --$W_O = W_A$--.

In column 11, line 20, change "A B/C d" to --A B/C D--.

In column 11, line 31, change "flap" to --flag--.

Signed and sealed this 11th day of March 1975.

(SEAL)
Attest:

RUTH C. MASON
Attesting Officer

C. MARSHALL DANN
Commissioner of Patents
and Trademarks